(12) United States Patent
Kajihara et al.

(10) Patent No.: US 8,102,560 B2
(45) Date of Patent: Jan. 24, 2012

(54) DEVICE FOR SEARCHING PRINT TARGET IMAGE ADAPTED FOR PRINTABLE AREA

(75) Inventors: Rie Kajihara, Yokohama (JP); Mitsuhiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 12/115,871

(22) Filed: May 6, 2008

(65) Prior Publication Data
US 2008/0278737 A1 Nov. 13, 2008

(30) Foreign Application Priority Data
May 8, 2007 (JP) .................. 2007-123667

(51) Int. Cl.
*G06K 15/00* (2006.01)
*G06F 15/00* (2006.01)

(52) U.S. Cl. ............ 358/1.18; 358/1.16; 358/1.17; 358/1.19; 715/248

(58) Field of Classification Search .......... 348/169; 358/1.18; 382/112, 116, 117, 118, 119; 715/248
See application file for complete search history.

(56) References Cited

U.S. PATENT DOCUMENTS

| | | | |
|---|---|---|---|
| 7,315,635 B2* | 1/2008 | Oosawa .................. | 382/128 |
| 7,469,378 B2* | 12/2008 | Nagahara et al. ............ | 715/243 |
| 7,860,162 B2* | 12/2010 | Yokomitsu et al. ...... | 375/240.12 |
| 2004/0078759 A1* | 4/2004 | Ohashi et al. ................. | 715/517 |
| 2005/0257170 A1* | 11/2005 | Kim et al. .................... | 715/825 |
| 2007/0058869 A1 | 3/2007 | Matsuzaka et al. | |
| 2007/0070201 A1* | 3/2007 | Yokomitsu et al. ........... | 348/169 |
| 2008/0002766 A1 | 1/2008 | Suwa et al. ............... | 375/240.12 |
| 2008/0031490 A1* | 2/2008 | Kobayashi .................... | 382/101 |
| 2008/0123150 A1 | 5/2008 | Ono et al. .................... | 358/3.27 |
| 2008/0123153 A1 | 5/2008 | Yamada et al. ............... | 358/3.27 |

FOREIGN PATENT DOCUMENTS

| | | |
|---|---|---|
| JP | 2003-18388 | 1/2003 |
| JP | 2006-167965 | 6/2006 |
| JP | 2007-065940 A | 3/2007 |

OTHER PUBLICATIONS

Japanese Office Action issued on Aug. 12, 2011, in counterpart application 2007-123667.

* cited by examiner

*Primary Examiner* — Jerome Grant, II
(74) *Attorney, Agent, or Firm* — Fitzpatrick, Cella, Harper & Scinto

(57) ABSTRACT

The present invention provides an image searching device that searches a print target image adapted for a printable area only by setting a template for the printable area and a search condition necessary to search the print target image. The image searching device inputs shape information on the printable area. Then, the image searching device sets the image search condition. Then, the image searching device searches the print target image from a plurality of images on the basis of the shape information on the printable area, and the image search condition. According to the image searching device, upon printing of an image in a specially-shaped printable area, a print target image adapted for the printable area can be automatically searched only by setting a shape of the printable area, and an image search condition, resulting in improvement of searching efficiency.

17 Claims, 18 Drawing Sheets

DEVICE FOR SEARCHING PRINT TARGET IMAGE ADAPTED FOR PRINTABLE AREA

BACKGROUND OF THE INVENTION

1. Field of the Invention

The present invention relates to a technique for searching a print target image to be printed on a label surface of an optical disk or in a specially-shaped printable area on nonstandard-sized paper.

2. Description of the Related Art

In recent years, a printer for personal use has been widely spread. A general user performs printing not only on standard-sized paper such as L size or A4 size paper of which a printable area has a rectangular shape, but also often on paper having a specially-shaped printable area. The paper having such specially-shaped printable area includes a label surface of an optical disk such as CD-R, special sticker paper to be stuck on an object surface, or nonstandard-sized postcard. There is also performed a printing procedure in which a vast number of digital images taken with a digital camera or digital video camera are stored in a personal computer, and some of the images are searched from these stored images for printing. For this purpose, there have been proposed a method for searching a print target image to be printed in the specially-shaped printable area, and a method for applying predetermined processing to a searched print target image to print it. For example, Japanese Patent Laid-Open No. 2003-018388 discloses a method comprising: inputting information in a field of a configuration template for an image layout format; searching an image to be laid out for each field; and automatically laying out the searched image. Also, Japanese Patent Laid-Open No. 2006-167965 discloses a method comprising: automatically enlarging an image such that a part of the image is printed on an entire label surface of an optical disk upon printing of it on the label surface of the optical disk.

Upon searching the print target image from the vast number of images, searching efficiency can be improved if the following steps can be automatically performed, i.e., the steps of first removing images inappropriate to printing in a specially-shaped printable area, and then searching the print target image from images appropriate to printing in the specially-shaped printable area. However, in Japanese Patent Laid-Open No. 2003-018338, a user needs to specify the layout for the image on the basis of the printable area by him-/herself. As a result, if there are a plurality of layouts for the image adapted for the printable area, the user also needs to specify a plurality of search conditions, and therefore such setting operation by the user becomes complicated. Also, the user makes the setting by him-/herself, so that it may be difficult to specify the layouts for all images adapted for the printable area. In Japanese Patent Laid-Open No. 2006-167965, if a print target image is edited (enlarged or reduced) on the basis of a user's preference, the image may protrude out of a printable area as a result of the enlargement even if the image prior to the edition fits into the printable area. As described, such conventional techniques have a problem that the print target image adapted for the specially-shaped printable area cannot be simply searched from the vast number of images.

SUMMARY OF THE INVENTION

It is therefore an object of the present invention to provide, in consideration of such problem, an image searching device that searches a print target image adapted for a printable area only by setting a template for the printable area and a search condition necessary to search the print target image.

An image searching device of the present invention provides a component for inputting shape information on a printable area, a component for setting an image search condition, and a component for searching a print target image from a plurality of images on the basis of the shape information on the printable area, and the image search condition.

In the image searching device of the present invention, the component for searching a print target image is configured to detect a main subject included in the image, and output as the print target image an image that includes the main subject fitting into the printable area and covers a whole of the printable area.

An image searching method of the present invention includes the steps of inputting shape information on a printable area, setting an image search condition, and searching a print target image from a plurality of images on the basis of the shape information on the printable area, and the image search condition.

In the image searching method of the present invention, the step of searching a print target image detects a main subject included in the image, and outputs as the print target image an image that includes the main subject fitting into the printable area and covers a whole of the printable area.

A computer-readable recording medium of the present invention instructs a computer to perform the steps of inputting shape information on a printable area, setting an image search condition, and searching a print target image from a plurality of images on the basis of the shape information on the printable area, and the image search condition.

According to the present invention, upon printing of an image in a specially-shaped printable area, a print target image adapted for the printable area can be automatically searched only by setting a shape of the printable area, and an image search condition, resulting in improvement of searching efficiency.

Further features of the present invention will become apparent from the following description of exemplary embodiments (with reference to the attached drawings).

DESCRIPTION OF THE EMBODIMENTS

Preferred embodiments of the present invention will hereinafter be described in detail with reference to the drawings.

In the following embodiments, functions of an image searching device may be incorporated in an information device such as a personal computer, or a printer. The image searching device has a storage device. Preferably, an image management application software installed on a personal computer provides an image search function, and a hard disk for a personal computer is a storage device for storing a search target image. Furthermore, it may be configured such that a printer in which an image management application is installed searches an image stored in a printer's memory in accordance with instructions via a user-interface of the printer.

Embodiment 1

Figure 1:
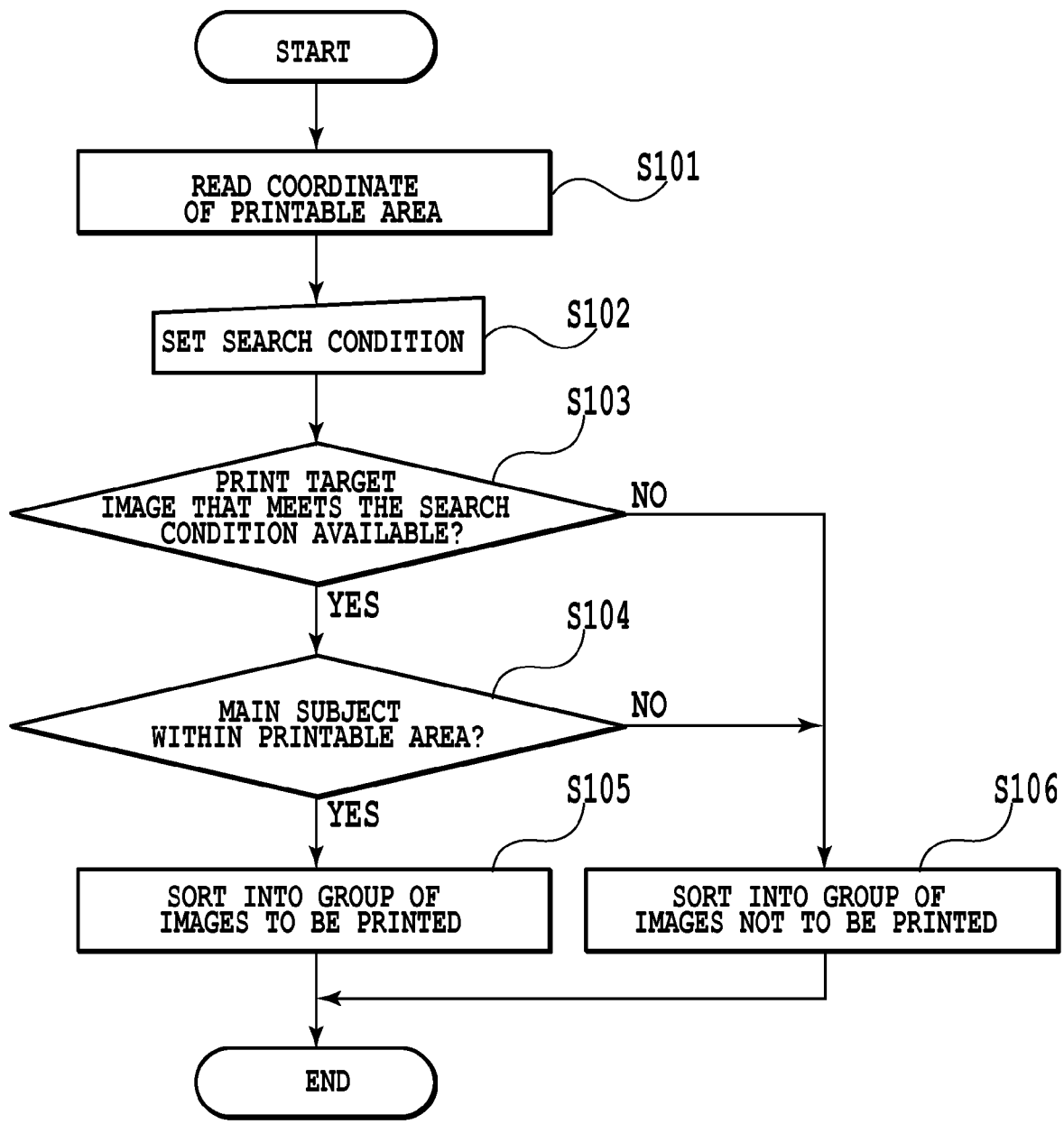
FIG. 1 is a flowchart illustrating a procedure for searching an image to be printed on a nonstandard-sized postcard or in a specially-shaped printable area such as on a sticker.
Figure 2:
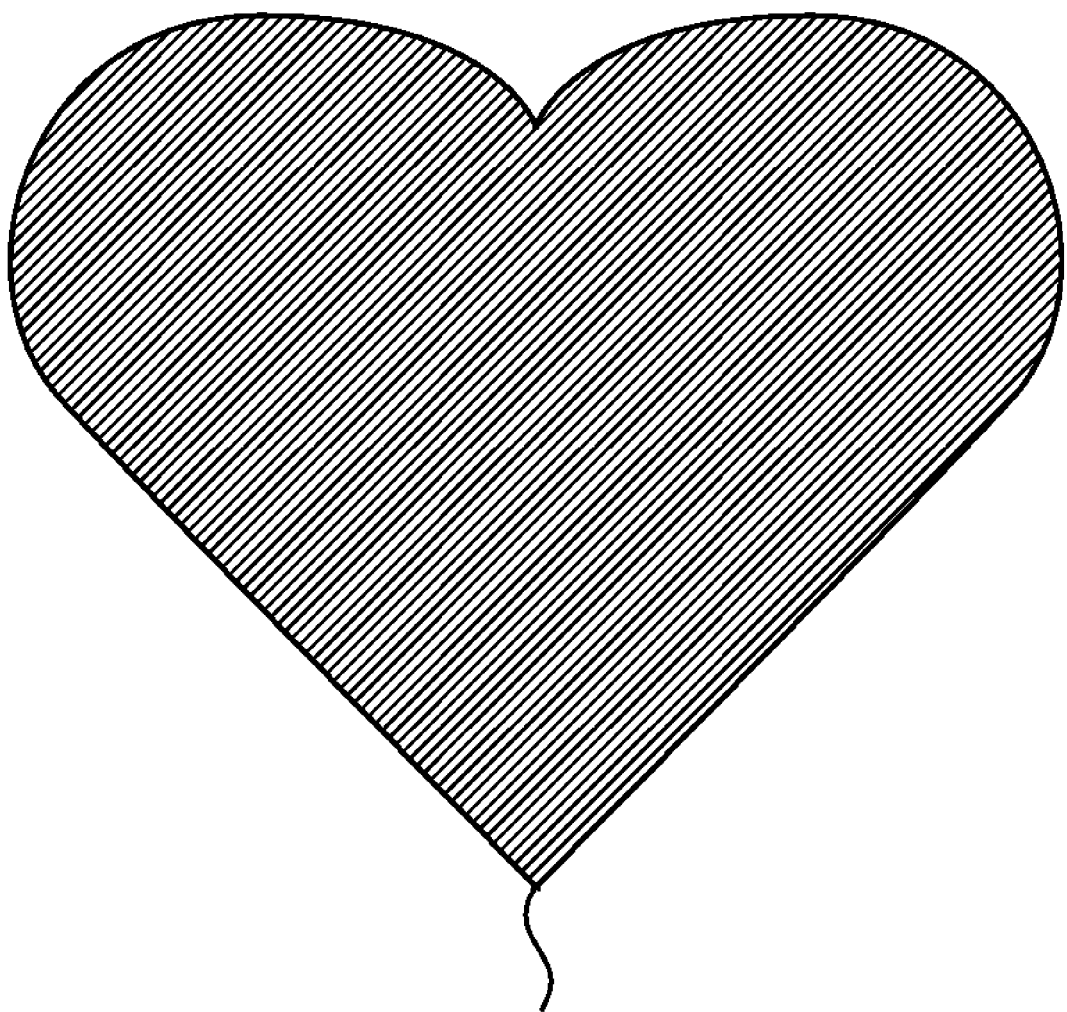
FIG. 2 is a diagram illustrating a heart-shaped printable area.

FIG. 1 is a flowchart illustrating a procedure for searching a print target image to be printed on a nonstandard-sized postcard or in a specially-shaped printable area such as on a sticker. FIG. 2 is a diagram illustrating a heart-shaped printable area.

In Step S101, the image searching device reads out shape information on the heart-shaped printable area from the storage device. The shape information is preliminarily stored in the storage device as a template. In Embodiment 1, the shape information substantially consists of coordinate information. That is, the image searching device reads out the coordinate information on the heart-shaped printable area from the storage device. The coordinate information t[x, y] on the template is preliminarily stored in the storage device. On the other hand, coordinate information on a template not stored in the storage device can be additionally set by scanning as a printable area with a scanner connected to a personal computer, or can be set with shape information on the printable area inputted into the personal computer by a user.

It is assumed that coordinate information on a template is represented by bit map and if $t[x,y]=1$          Expression (1.1)

t[x, y] is information on an area within the printable area, whereas if $t[x,y]=0$          Expression (1.2)

t[x, y] is information on an area outside the printable area.

Information to be compared with an after-mentioned search condition by using an image analysis function of a camera for shooting when taking picture is automatically added to a search target image. Obviously, upon a user manually enters information to be compared with the after-mentioned search condition in the image searching device, the information may be added to the search target image.

In Step S102, the user sets a search condition for searching a print target image via an after-mentioned image search condition setting screen. The search condition includes a keyword, person's facial feature, image feature appearing in a photograph of a night view or snapshot, type of paper to be printed thereon, shooting date and time, and the like. The search condition may be any combination of such condition elements.

In Step S103, the image searching device starts searching the print target image meeting the search condition having been set, and if the print target image meeting the search condition is available, the flow proceeds to Step S104, whereas if the print target image meeting the search condition is unavailable, the flow proceeds to Step S106. In Step S106, the image searching device sorts an image not meeting the search condition into a group of images not to be printed.

Figure 3:
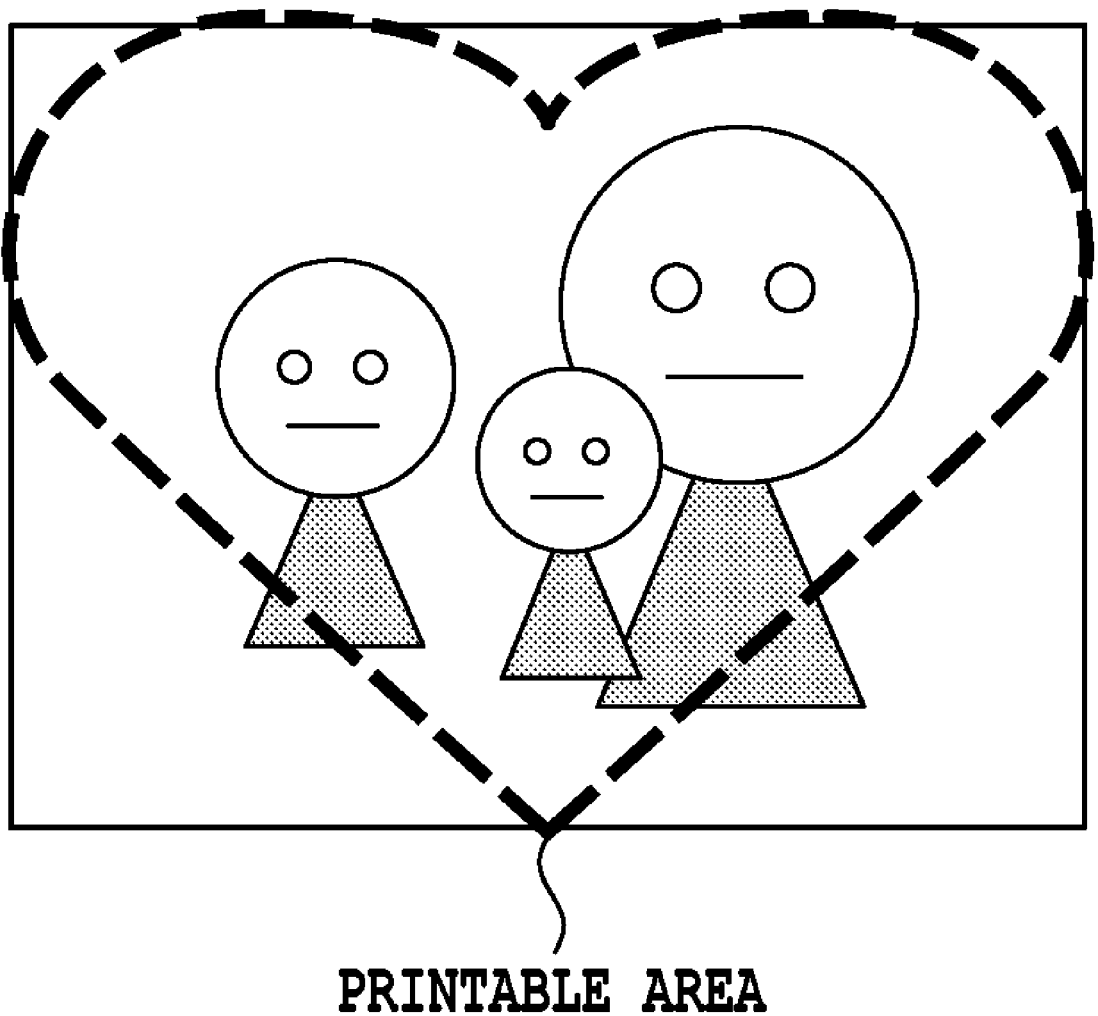
FIG. 3 is a diagram illustrating a state where people's faces fit into the heart-shaped printable area.

In Step S104, the image searching device detects a main subject within the print target image meeting the search condition having been set; determines whether or not it fits into the printable area; and if it fits into the printable area, the flow proceeds to Step S105, whereas if it does not fit into the printable area, the flow proceeds to Step S106. In Embodiment 1, the main subject is supposed to be people's faces. To detect the people's faces in the image, a publicly-known face region detecting algorithm can be used. The face recognition algorithm is used to detect a face region in the image, and then if all coordinates (x[i], y[i]) in the detected face region meet Expression (1.1), i.e., $t(x[i],y[i])=1$          Expression (1.3)

the people's faces fit into the printable area as illustrated in FIG. 3.

In Step S105, the image searching device sorts the image including the face region fitting into the printable area into a group of images to be printed. The sorted print target image is outputted as a result of the search.

Figure 4:
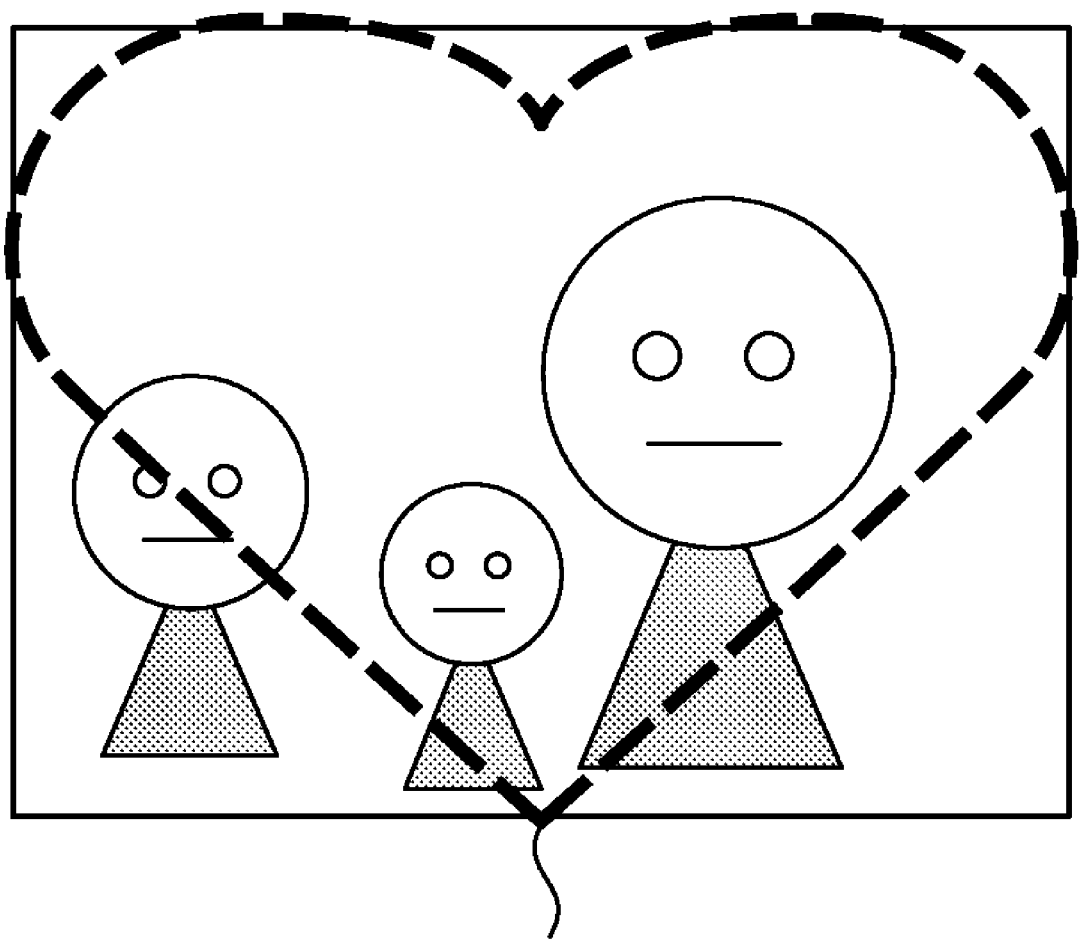
FIG. 4 is a diagram illustrating a state where the people's faces do not fit into the heart-shaped printable area.
Figure 5:
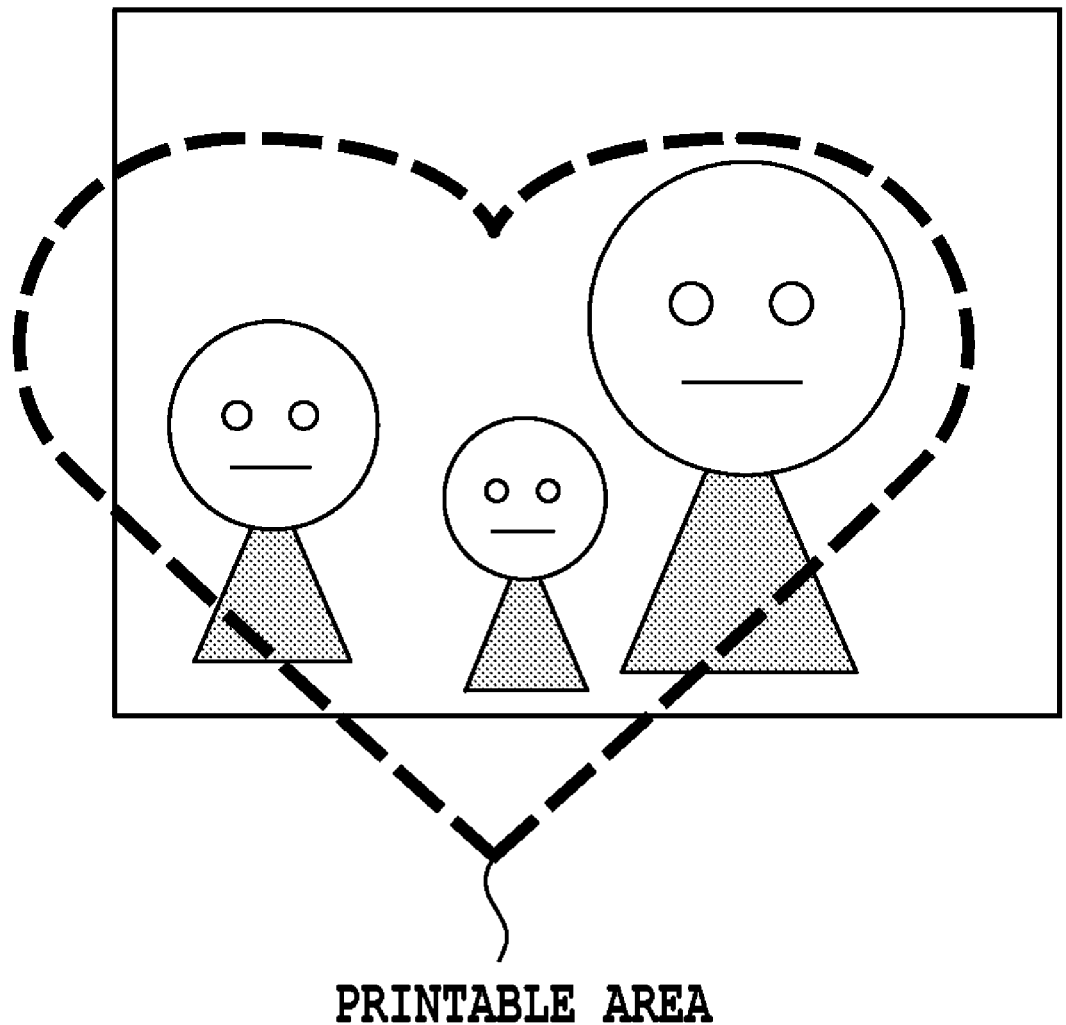
FIG. 5 is a diagram illustrating a state where blank spaces appear in the hear-shaped printable area.

On the other hand, if any of the coordinates (x[i], y[i]) within the people face region meets Expression (1.2), i.e., $t(x[i],y[i])=0$          Expression (1.4)

part of the people's faces protrudes outside the printable area as illustrated in FIG. 4. In this case, the image searching device sorts the searched image into the group of images not to be printed. Also, if the printable area is displaced to allocate the face region so as to fit into the printable area, blank spaces may appear in the printable area as illustrated in FIG. 5 (left and lower parts of the heart shape). In this case, the image searching device also sorts the searched print target image into the group of images not to be printed.

Embodiment 2

Figure 6:
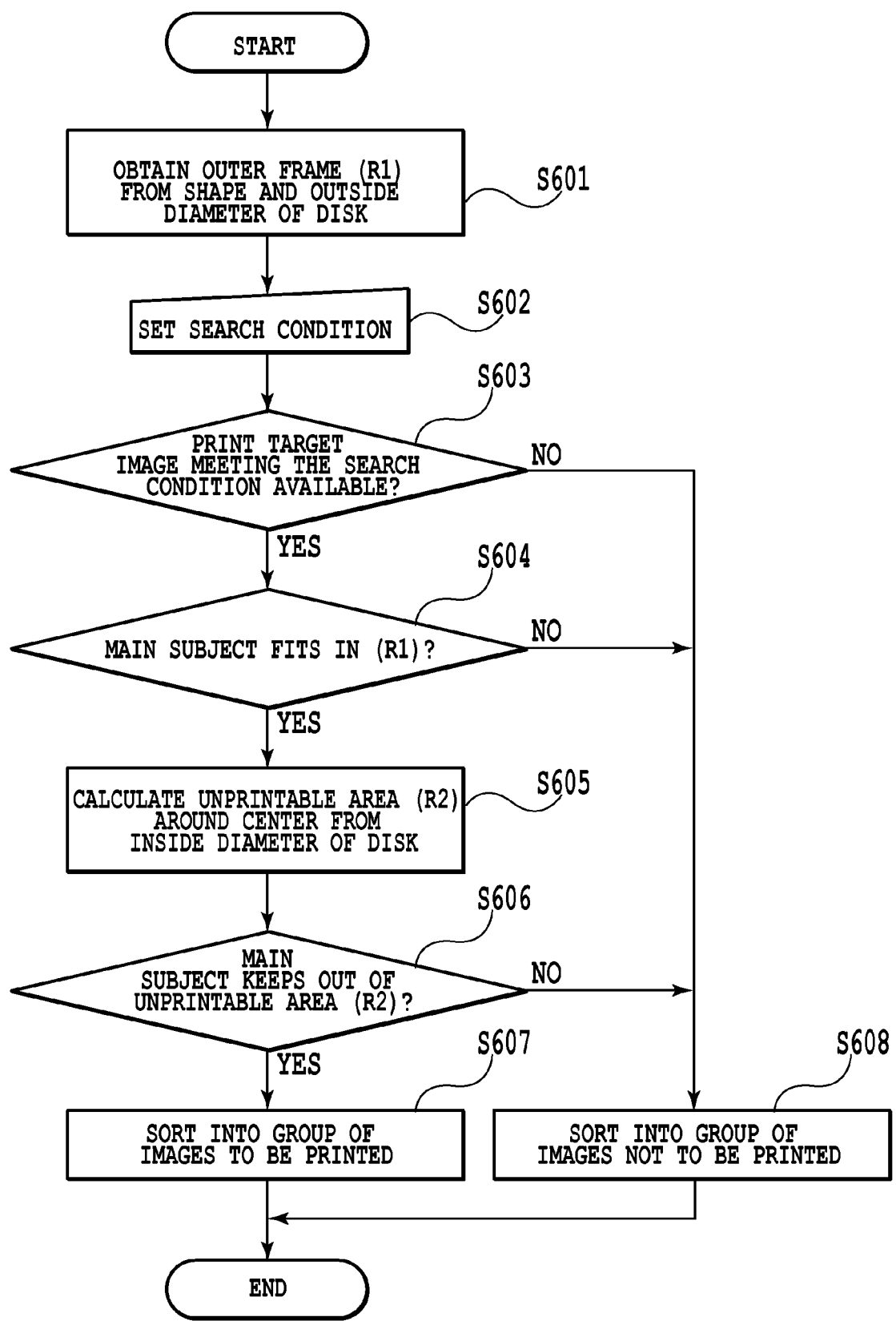
FIG. 6 is a flowchart illustrating a procedure for searching an image to be printed on a label surface of an optical disk.
Figure 7:
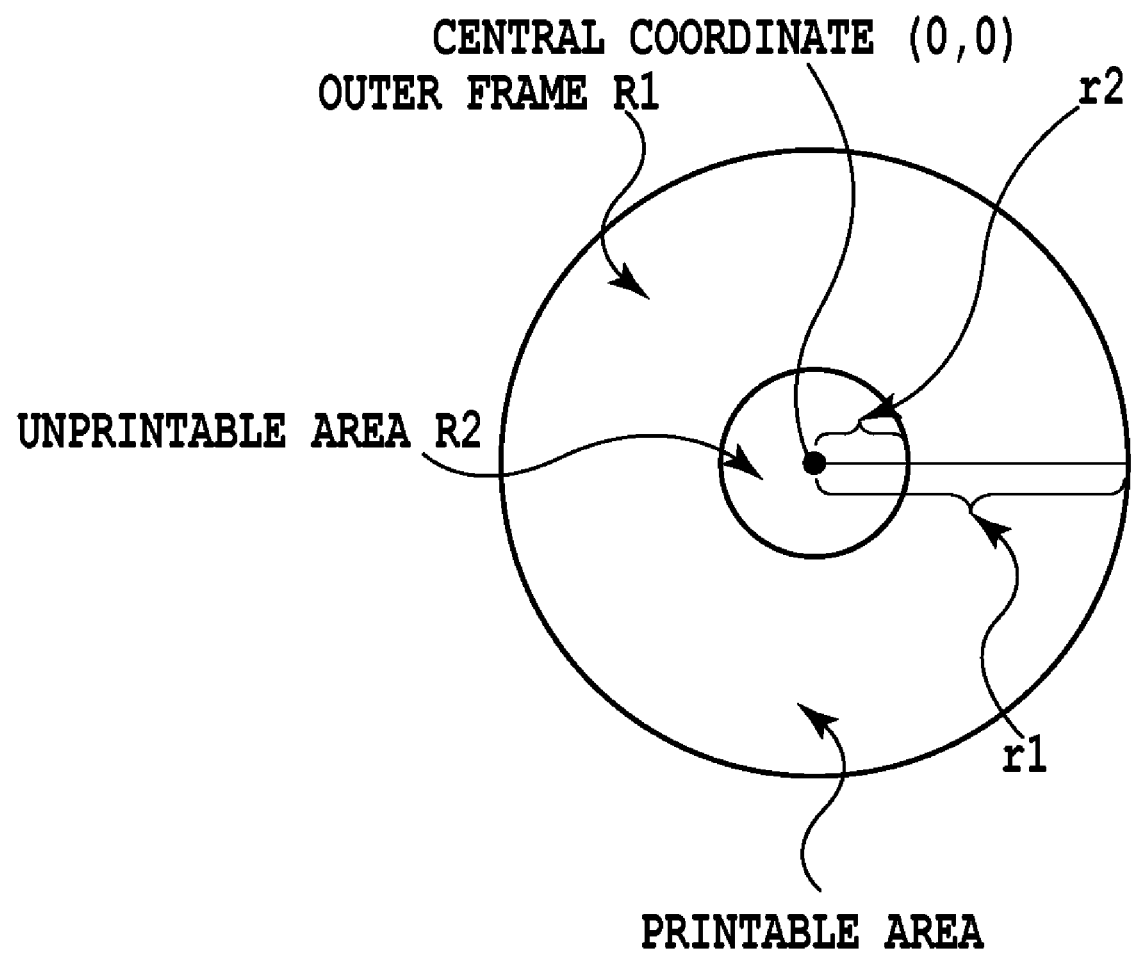
FIG. 7 is a diagram illustrating a shape of the optical disk.

FIG. 6 is a flowchart illustrating a procedure for searching a print target image to be printed on a label surface of an optical disk. FIG. 7 illustrates a shape of the optical disk. The optical disk has a donut shape, and therefore a shape thereof can be represented by an outside diameter $2*r1$, inside diameter $2*r2$, outer frame R1, unprintable area R2, and central coordinate (0, 0). The outer frame R1 corresponds to an area inside a circle having a radius r1 and the unprintable area R2 corresponds to an area inside a circle having a radius r2. The outside and inside diameters 2*r1 and 2*r2 can be set by a user via the after-mentioned image search condition setting screen.

In Step S601, the image searching device obtains the outer frame R1 from the outside diameter 2*r1 with the use of Expression (2.1):

$$R1=\pi r1^2 \qquad \text{Expression (2.1)}$$

Subsequently, the image searching device once stores coordinate information R1[x, y] on the outer frame R1 in the storage device. The coordinate information on the outer frame R1 may be preliminarily stored in the storage device.

In Step S602, the user sets a search condition for searching an image via the after-mentioned image search condition setting screen. The search condition is as described above.

In Step S603, the image searching device starts searching the print target image meeting the search condition having been set, and if the print target image meeting the search condition is available, the flow proceeds to Step S604, whereas if the print target image meeting the search condition is unavailable, the flow proceeds to Step S608. In Step S608, the image searching device sorts a print target image not meeting the search condition into the group of images not to be printed.

Figure 9:
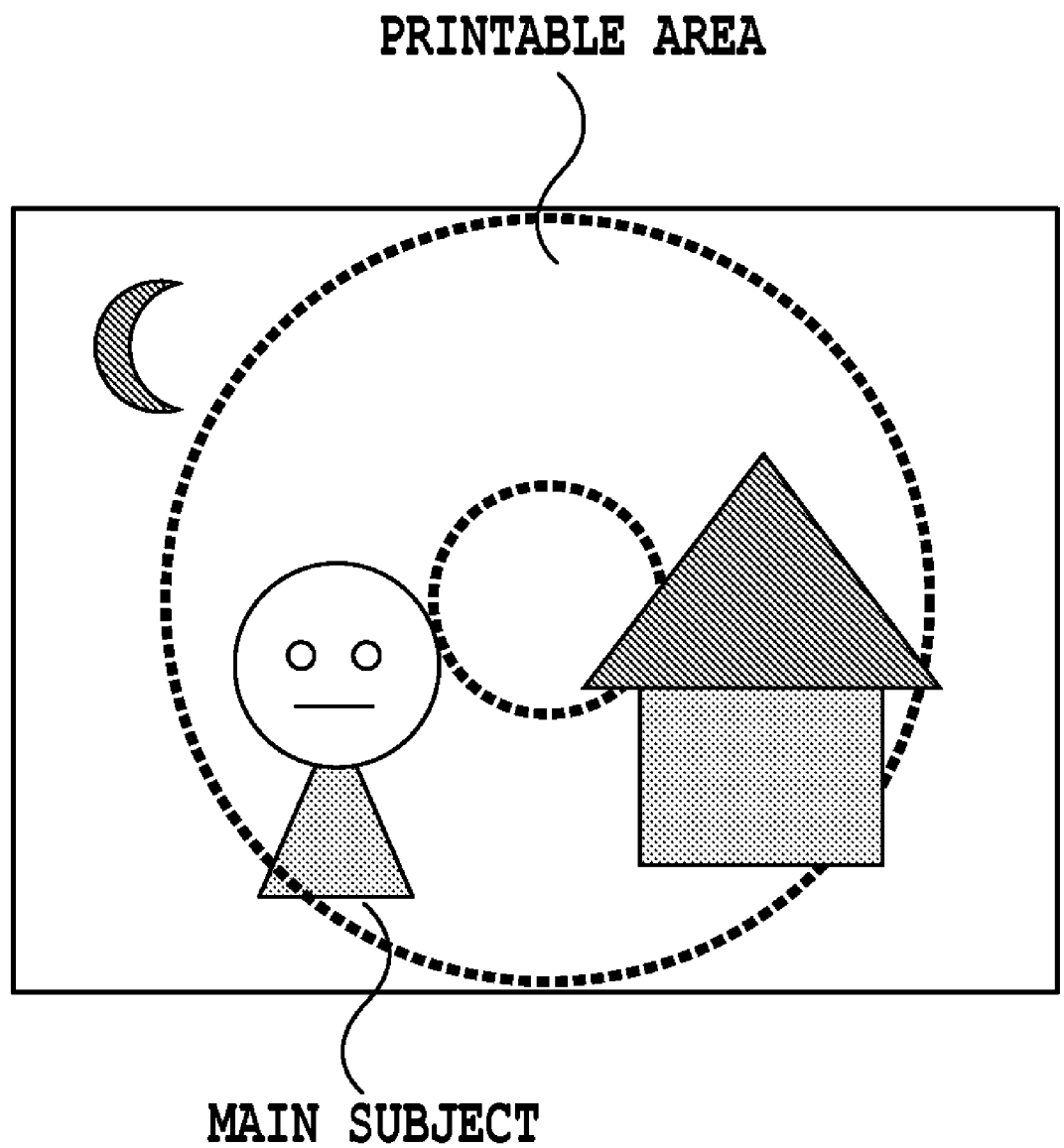
FIG. 9 is a diagram illustrating a state where a face region fits into the printable area on the label surface of the optical disk.

In Step S604, the image searching device reads out the coordinate information on the outer frame R1 from the storage device; determines whether or not a main subject within the image meeting the search condition fits into the outer frame R1; and if it fits into the outer frame R1, the flow proceeds to Step S605, whereas if it does not fit into the outer frame R1, the flow proceeds to Step S608. In Embodiment 2, the main subject is supposed to be a person's face. The face detecting algorithm is used to detect a face region within the image, and then if all coordinates (x[i], y[i]) in the detected face region meet Expression (2.2), i.e., $$R1(x[i],y[i])=1 \qquad \text{Expression (2.2)}$$

the face region fits into the outer frame R1 as illustrated in FIG. 9.

Figure 8:
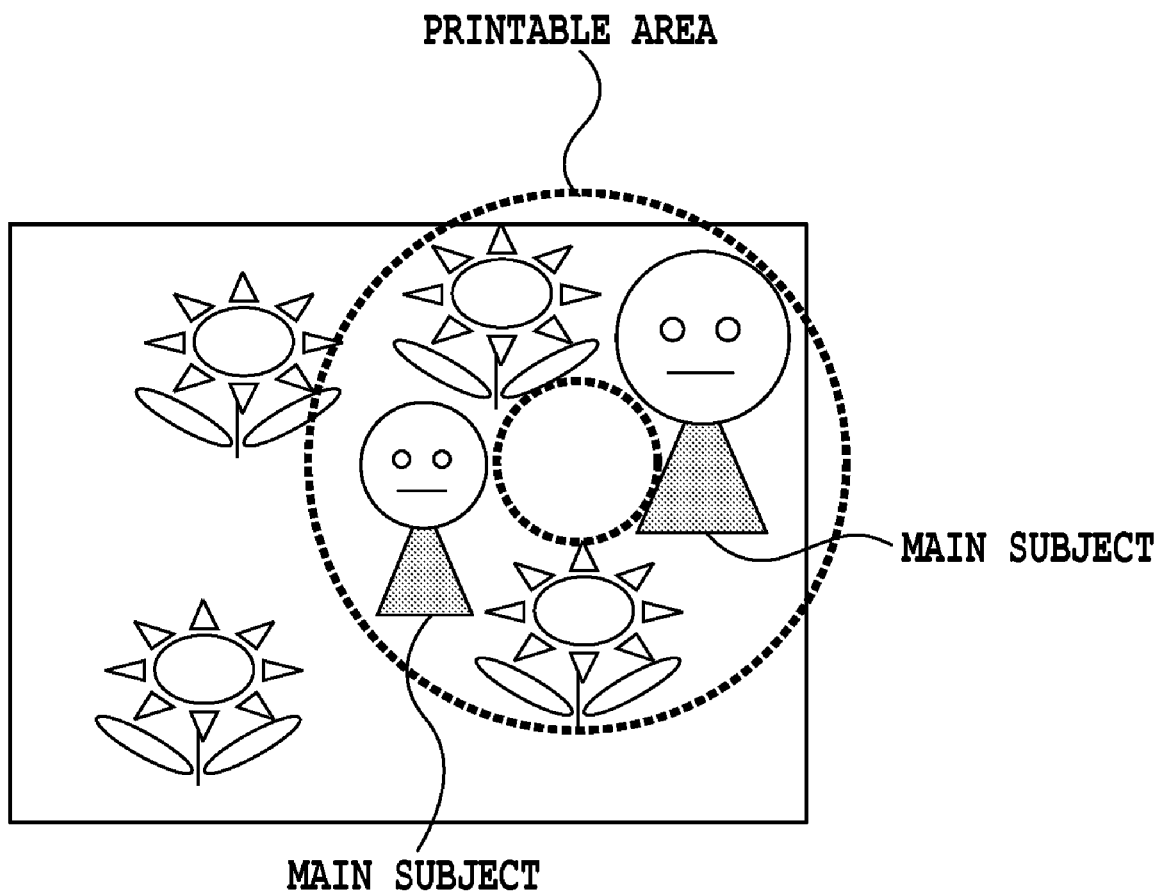
FIG. 8 is a diagram illustrating a state where blank spaces appear in a printable area when a face region is allocated so as to fit into the printable area on the label surface of the optical disk.

On the other hand, if any of the coordinates (x[i], y[i]) within the person face region meets Expression (2.3), i.e., $$R1(x[i],y[i])=0 \qquad \text{Expression (2.3)}$$

the face region protrudes outside the outer frame R1. In this case, the image searching device sorts the searched image into the group of images not to be printed. Also, if the outer frame R1 is displaced to allocate the face region so as to fit into the outer frame R1, blank spaces may appear in the outer frame R1 as illustrated in FIG. 8 (upper and right parts of the outer frame R1). In this case, the image searching device also sorts the searched print target image into the group of images not to be printed.

In Step S605, the image searching device obtains the unprintable area R2 around the center of the optical disk from the inside diameter 2*r2 with the use of Expression (2.4).

$$R2=\pi r2^2 \qquad \text{Expression (2.4)}$$

Subsequently, the image searching device once stores coordinate information R2 [x, y] on the unprintable area R2 in the storage device. The coordinate information on the unprintable area R2 may be preliminarily stored in the storage device.

In Step S606, the image searching device reads out the coordinate information on the unprintable area R2 from the storage device, and determines whether or not the face region overlaps with the unprintable area R2. If the face region does not overlap with the unprintable area R2 as illustrated in FIG. 9, i.e., Expression (2.5) is met, $$R2(x[i],y[i])=0 \qquad \text{Expression (2.5)}$$

the flow proceeds to Step S607.

Figure 10:
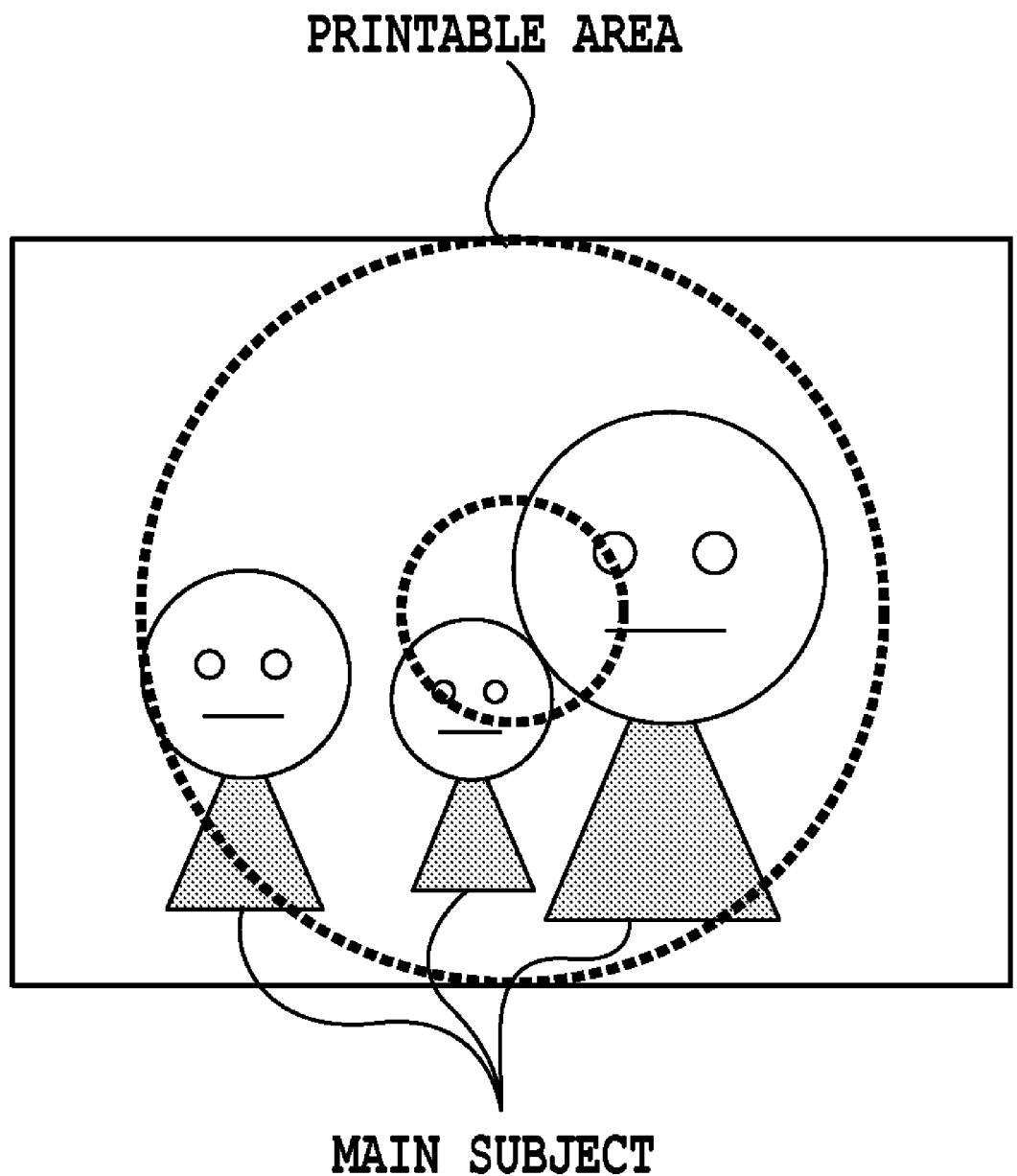
FIG. 10 is a diagram illustrating a state where a face region protrudes into an unprintable area on the label surface of the optical disk.

On the other hand, if the face region overlaps with the unprintable area R2 as illustrated in FIG. 10 (faces of right and middle persons overlap with R2), i.e., Expression (2.6) is met, $$R2(x[i],y[i])=1 \qquad \text{Expression (2.6)}$$

the flow proceeds to Step S608.

In Step S607, the image searching device sorts the searched print target image into the group of images to be printed.

In Step S608, the image searching device sorts the searched print target image into the group of images not to be printed.

According to Embodiment 2, the print target image printable on the label surface of the optical disk can be obtained by searching the print target image including the face region that fits into the outer frame R1 and does not overlap with the unprintable area R2.

Also, Embodiment 2 describes an example where the print target image including the face region completely fitting into the printable area is searched by comparing the pieces of coordinate information on the outer frame R1 and unprintable area R2 with the coordinate information on the face region. As another example, the print target image including the face region completely fitting into the printable area may be searched by using the optical disk being of a circular shape to compare shape information on the printable area obtained from the central coordinate, radius, angle, and the like with a position and size of the face region. Also, a size of the optical disk is generally standardized, so that it is possible to preliminarily store the information on the printable area.

Further, printing may be performed with an imaging device such as a digital camera, or digital video camera and a printing device such as an inkjet printer being directly connected to each other without through a personal computer. In such a case, if these devices store the shape information on the printable area to search the print target image, the user can simply perform direct printing on the label surface of the optical disk while checking a print result on a preview screen or the like provided by these devices.

Embodiment 3

Figure 11:
FIG. 11 is a diagram illustrating an example where characters are printed on the label surface of the optical disk.

Next, an example is described, where a print target image to be further printed on the label surface of the optical disk having been already printed with characters is searched. FIG. 11 illustrates the label surface of the optical disk printed with the characters. In Embodiment 3, a character region is set as the unprintable area; the other blank region (shaded region) is set as the printable area; and the print target image including a main subject not overlapping with the unprintable area is searched. A flowchart for searching the image is the same as that illustrated in FIG. 1.

Figure 12:
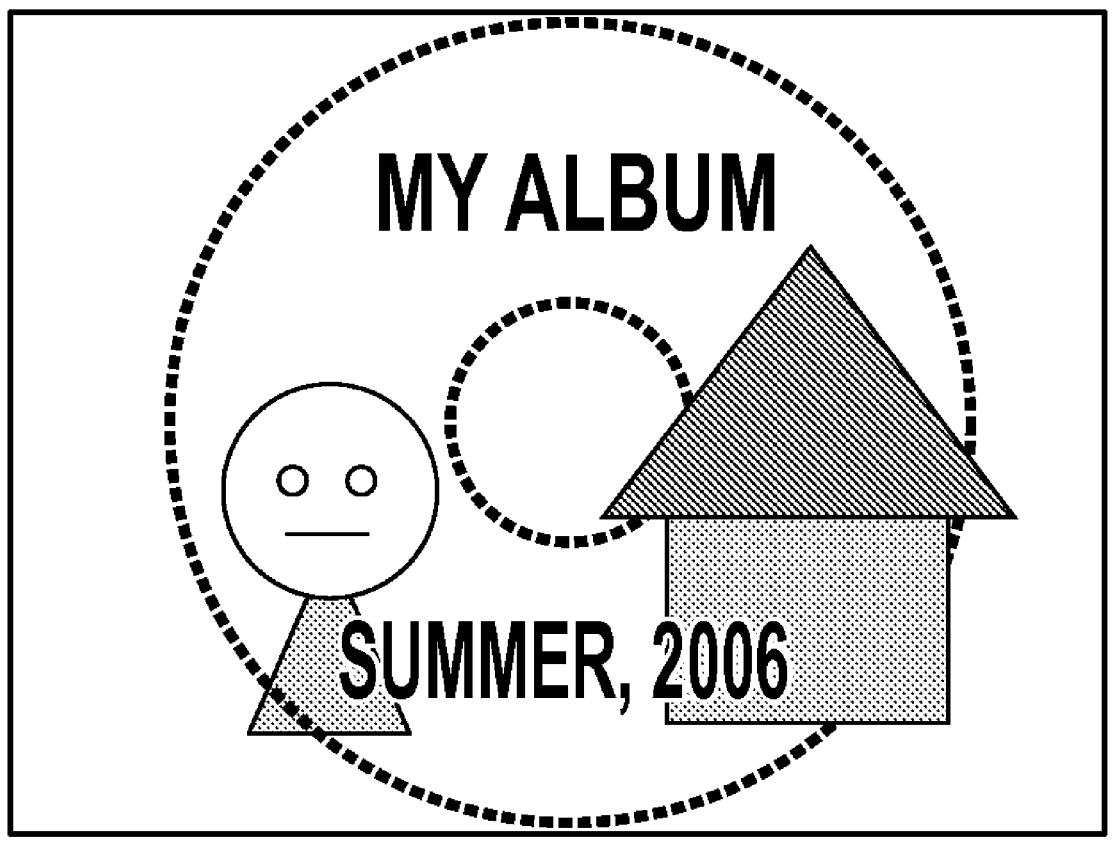
FIG. 12 is a diagram illustrating an example where a face region is allocated in a printable area.
Figure 13:
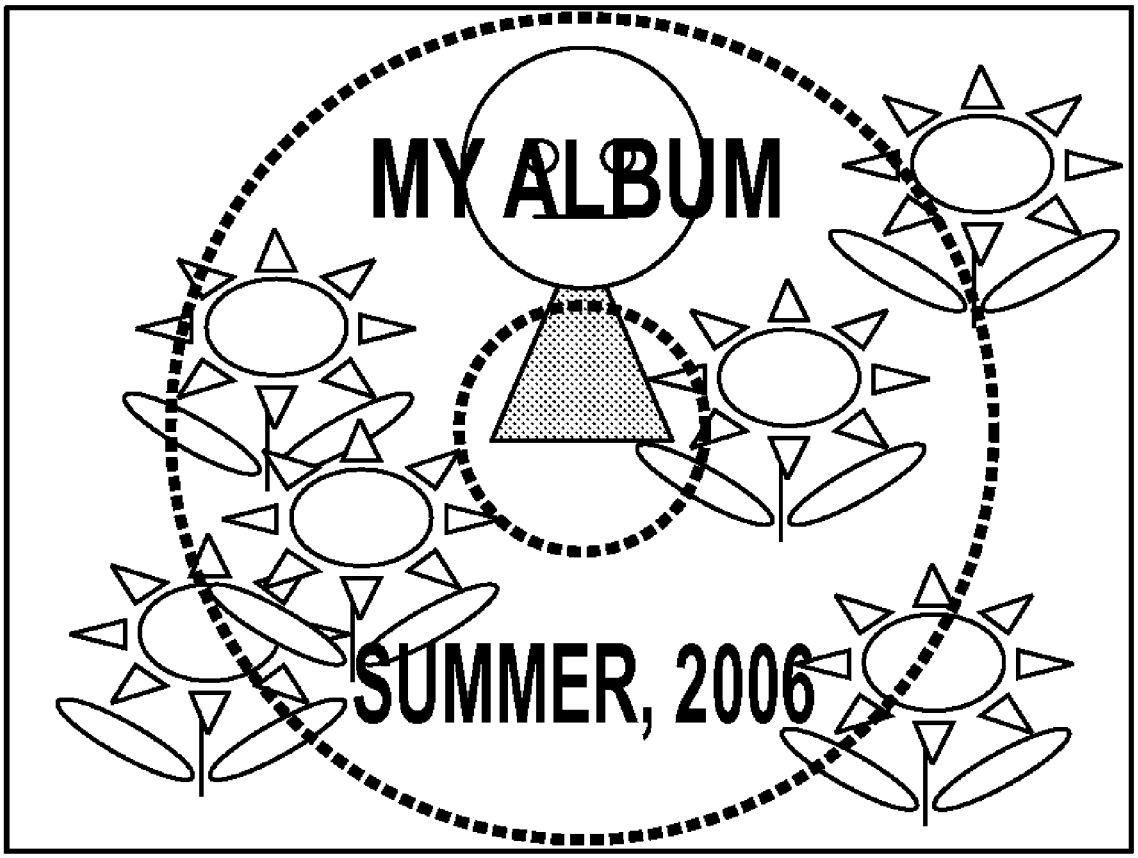
FIG. 13 is a diagram illustrating an example where the face region is allocated in the unprintable area.

FIG. 12 illustrates an example where a face region is allocated in a region other than the character region, i.e., in the printable area. FIG. 13 illustrates an example where the face region is allocated in the character region, i.e., in the unprintable area. It turns out from FIG. 13 that the face region and a character string "My album" overlap with each other.

Embodiment 4

Figure 15:
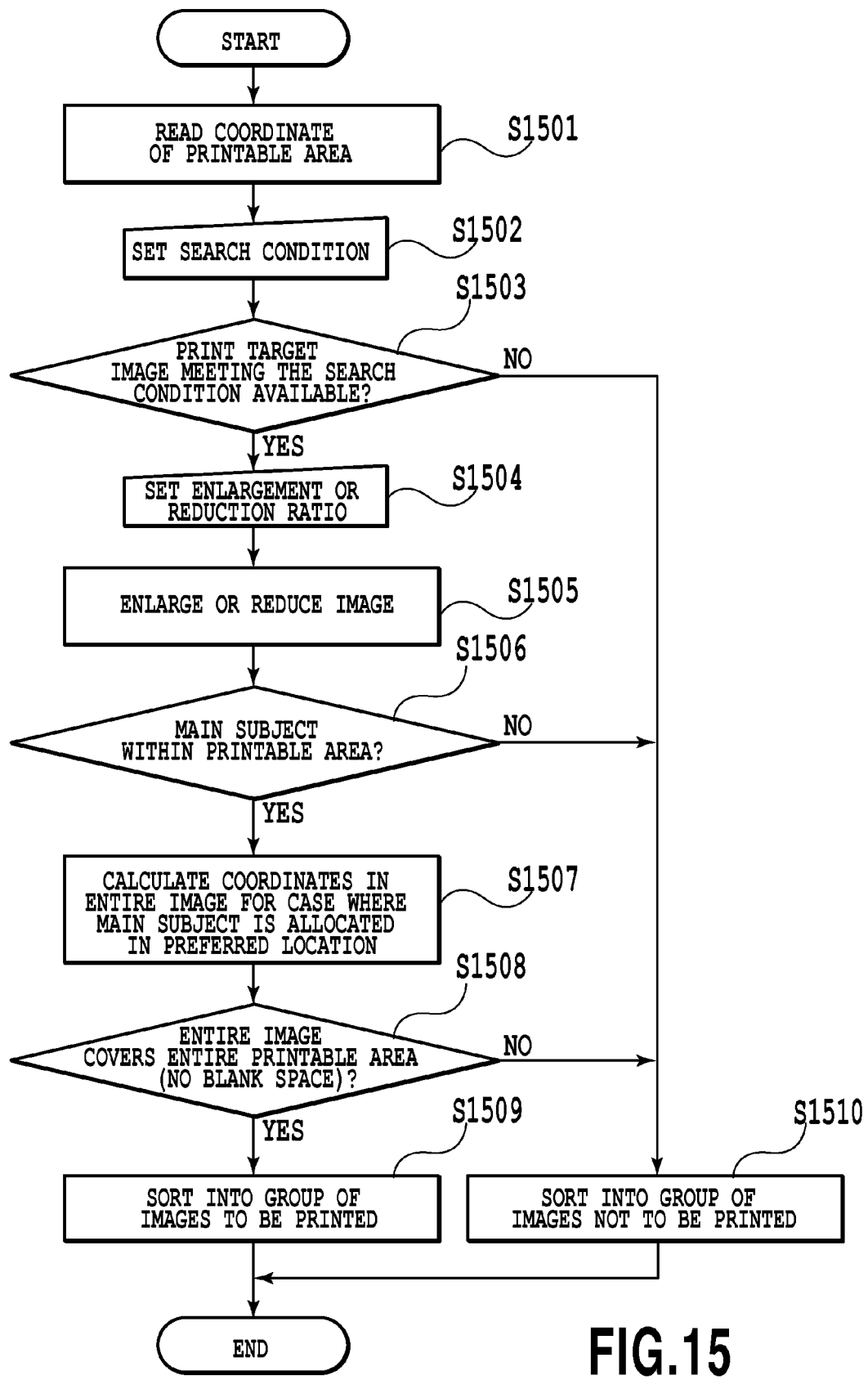
FIG. 15 is a flowchart illustrating a procedure for searching an image to be printed on a specially-shaped printable area with the entire image being enlarged or reduced.

FIG. 15 is a flowchart illustrating a procedure for printing a searched print target image in a specially-shaped printable area with the image being enlarged or reduced in accordance with a size of the printable area.

In Step S1501, the image searching device reads out shape information on the printable area from the storage device. The shape information is preliminarily stored in the storage device as a template. In Embodiment 4, the shape information substantially consists of coordinate information. The template is represented by coordination information t[x, y].

In Step S1502, a search condition for searching the image is set via the after-mentioned image search condition setting screen. The search condition is as described above.

In Step S1503, the image searching device starts searching the image meeting the search condition having been set, and if the image meeting the search condition is available, the flow proceeds to Step S1504, whereas if the image meeting the search condition is unavailable, the flow proceeds to Step S1510. In Step S1510, the image searching device sorts an image not meeting the search condition into the group of images not to be printed.

Figure 16:
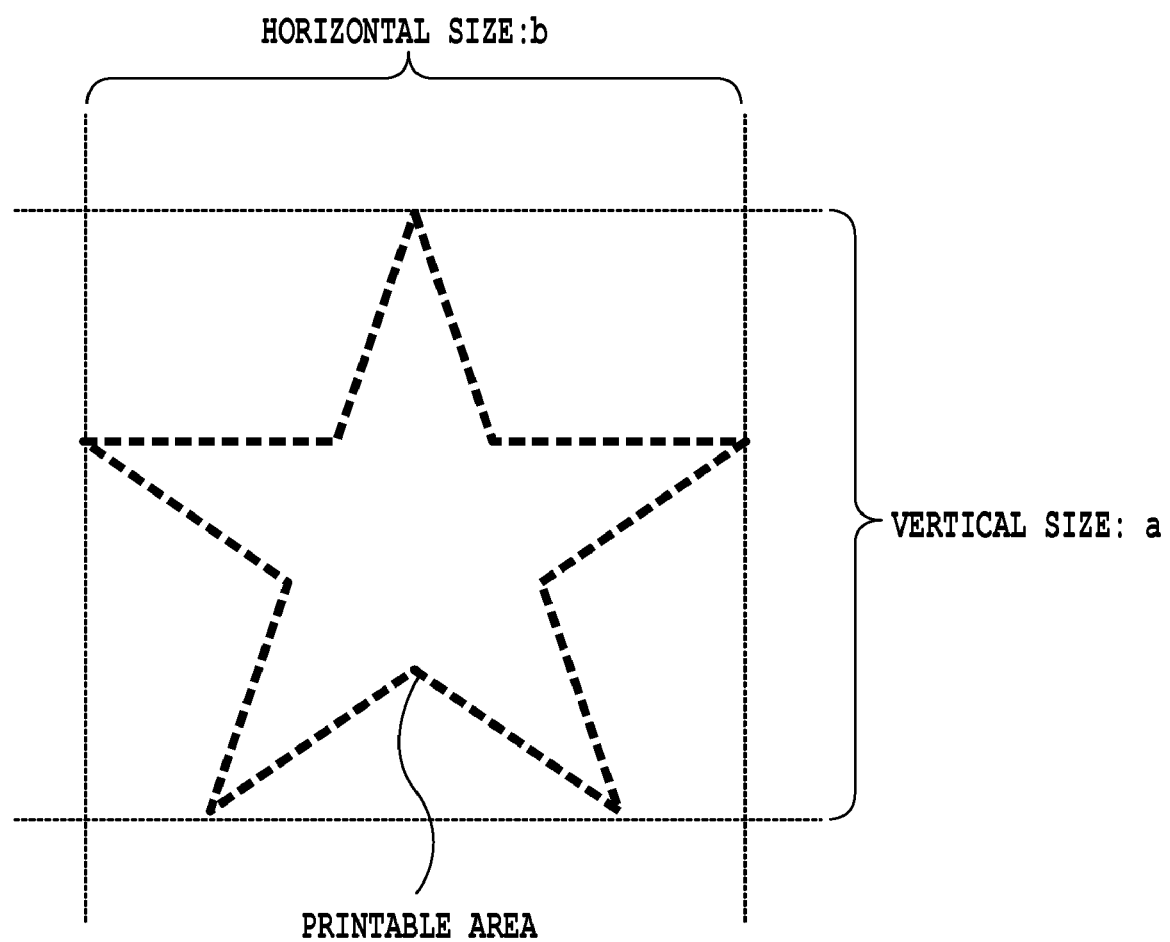
FIG. 16 is a diagram illustrating a star-shaped printable area.
Figure 17:
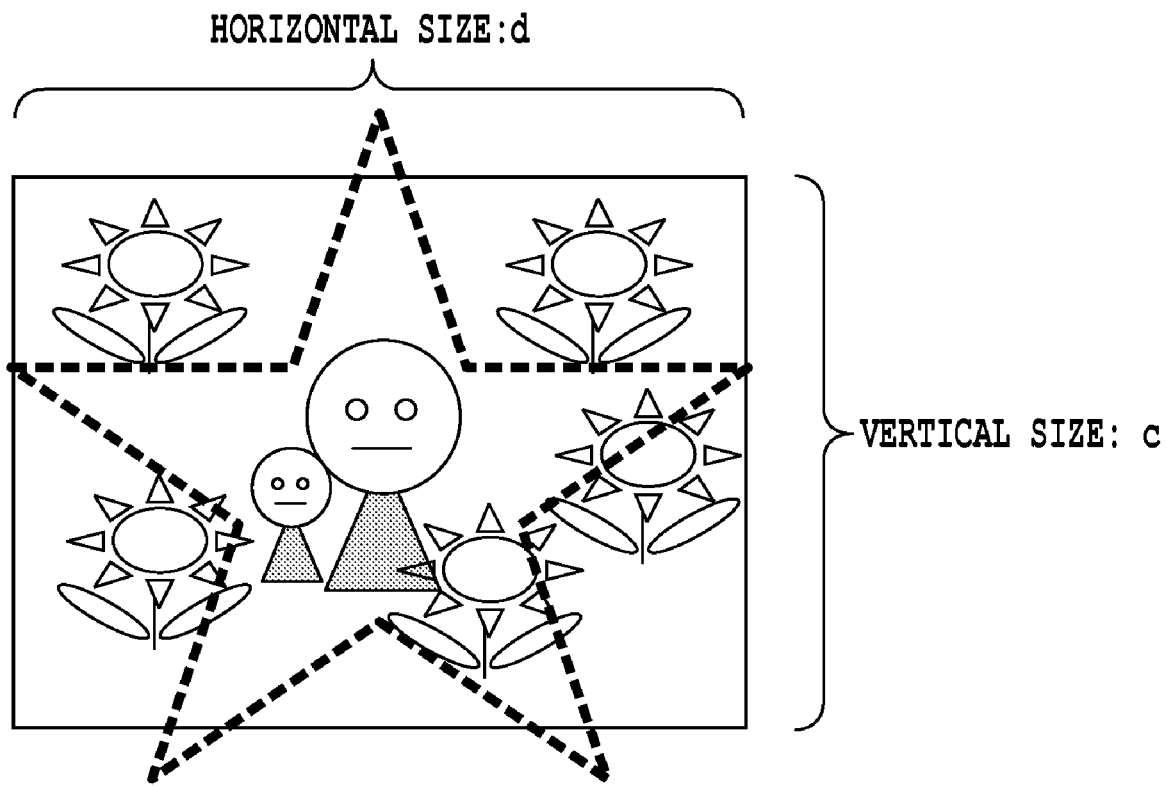
FIG. 17 is a diagram in which a rectangular image is overlapped on the star-shaped printable area.
Figure 18:
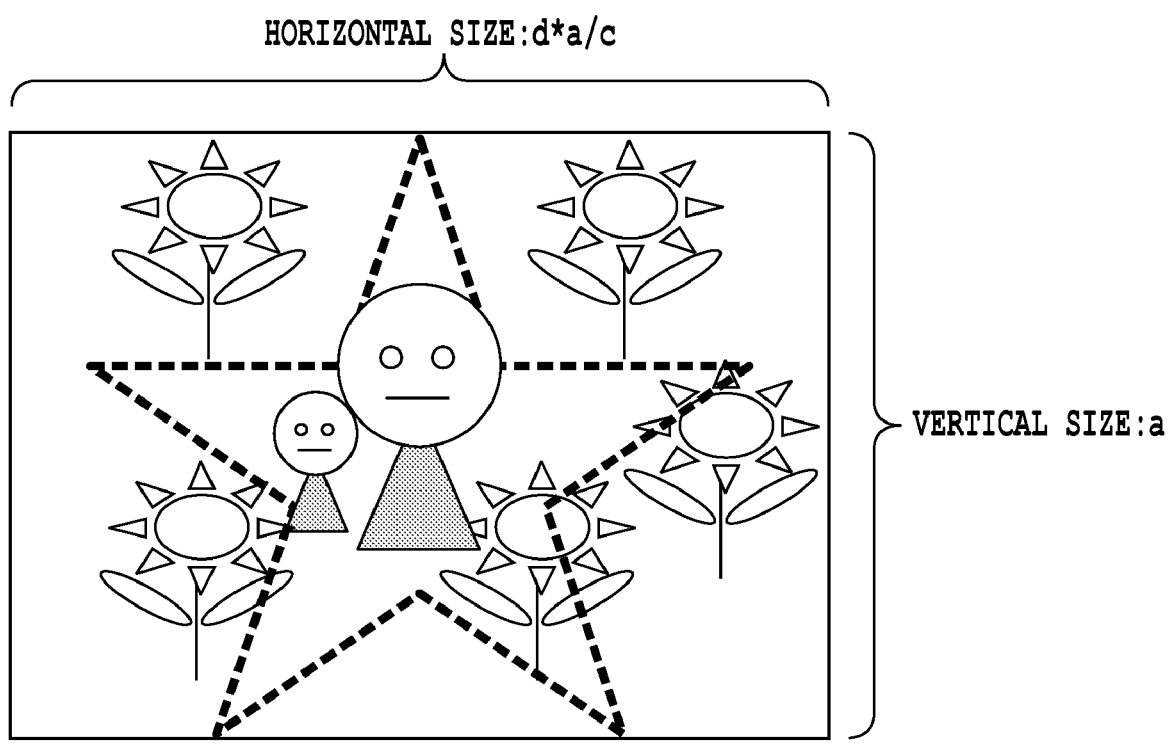
FIG. 18 is a diagram in which an enlarged rectangular image is overlapped on the star-shaped printable area.

In Step S1504, the image searching device sets an enlargement ratio or reduction ratio for the searched image. FIG. 16 illustrates a star-shaped printable area having a vertical size of "a" and horizontal size of "b". FIG. 17 illustrates a state where the image having a vertical size of "c" and horizontal size of "d" is overlapped on the printable area. As can be seen from FIG. 17, the star-shaped printable area has blank spaces (upper and lower parts of the printable area). For this reason, in order to enlarge the image illustrated in FIG. 17 in accordance with the size of the printable area illustrated in FIG. 16, vertical and horizontal ratios, "a/c" and "b/d", between them are compared with each other, and a ratio equal to or more than the ratio "a/c" is set as the enlargement ratio for the image. FIG. 18 illustrates a state where the image illustrated in FIG. 17, of which the vertical and horizontal sizes are enlarged "a/c" times, is overlapped on the printable area. By enlarging the image as described, the image covers the entire printable area, and therefore the blank spaces as illustrated in FIG. 17 disappear. In addition, any value may be adapted to be set as the enlargement ratio by the user if the value is equal to or more than the ratio "a/c". Also, if the image is reduced, the reduction ratio is set such that the reduced image covers the entire printable area.

In Step S1505, the image searching device enlarges or reduces the image at the set enlargement or reduction ratio.

In Step S1506, the image searching device determines whether or not a main subject within the enlarged or reduced image fits into the printable area. In Embodiment 4, the main subject is supposed to be a person. If the main subject fits into the printable area, the flow proceeds to Step S1507, whereas if it does not fit into the printable area, the flow proceeds to Step S1510. Note that it may be configured such that if the main subject does not fit into the printable area in Step S1506, the flow returns to Step S1504 where the main subject is fitted into the printable area by changing the enlargement or reduction ratio or moving the main subject.

In Step S1507, the image searching device calculates coordinates in the entire image for a case where the main subject is allocated in a preferred location within the printable area.

In Step S1508, the image searching device further determines whether or not the enlarged or reduced image covers the entire printable area. That is, in Step S1508, it is determined whether or not there is any blank space in the printable area, and if there is no blank space in the printable area, the flow proceeds to Step S1509, whereas if there is some blank space in the printable area, the flow proceeds to Step S1510. Note that it may be configured such that if it is determined in Step S1508 that there is some blank space in the printable area, the flow returns to Step S1504 where the image is made to cover the entire printable area by changing the enlargement or reduction ratio.

In Step S1509, the image searching device sorts the image into the group of images to be printed.

In Step S1510, the image searching device sorts the image into the group of images not to be printed.

In the above Embodiments 1 to 4, if the main subject is a person, a direction of a face of the person can be determined with a publicly-known image analysis technique. Accordingly, as the search condition, a direction of a person's face may be set. Also, a size of the main subject occupying the printable area may be adapted to be set. Further, a still image clipped out of a moving image may be an object to be searched. In this case, the still image may be one obtained by clipping the moving image at certain time intervals.

Next, a user interface for setting a search condition for searching an image in Embodiments 1 to 4 is described.

Figure 14:
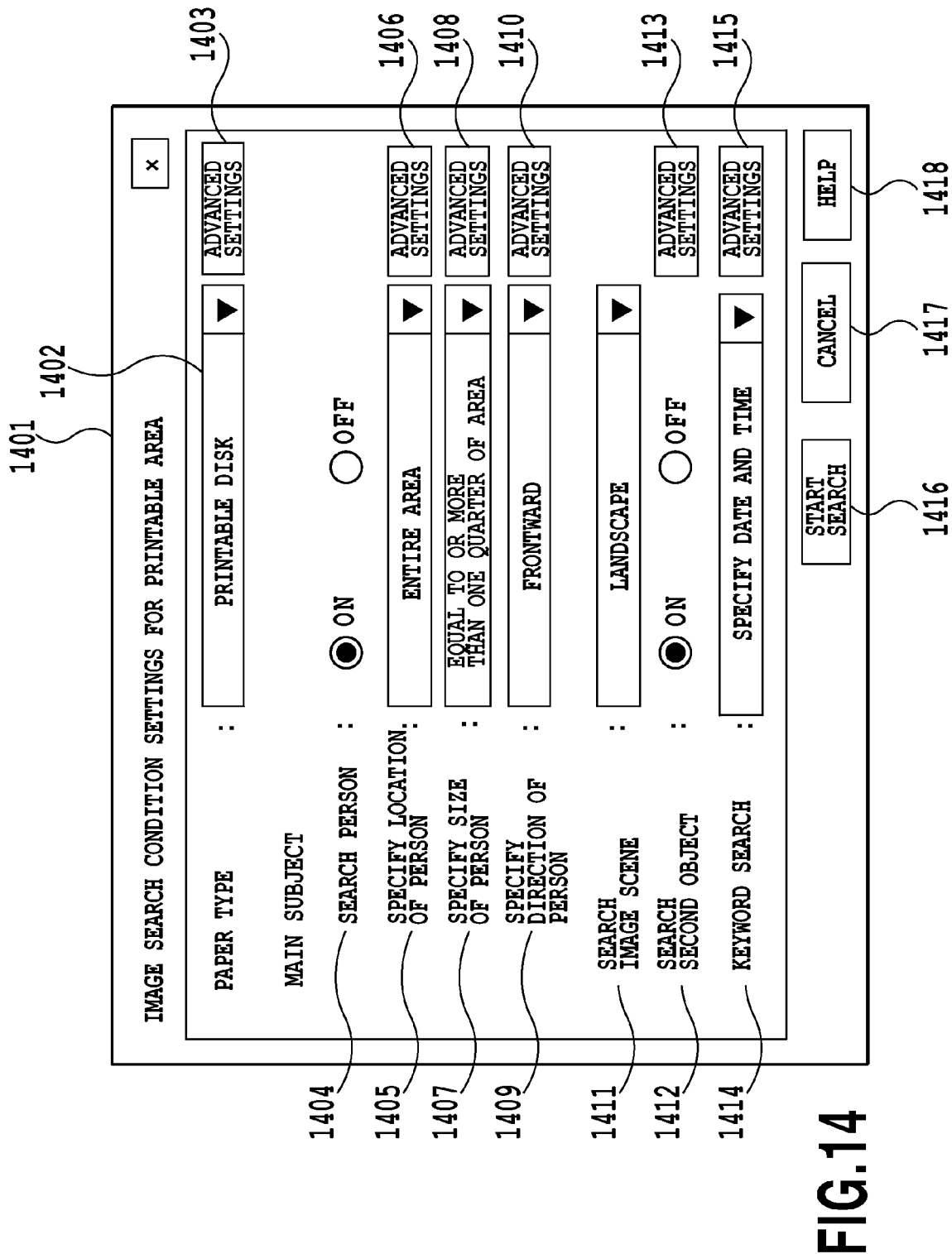
FIG. 14 is a diagram illustrating an example of an image search condition setting screen used by a user to set a condition necessary for image search.

FIG. 14 illustrates an example of the image search condition setting screen used by the user to set a condition necessary for image search.

Reference numeral 1401 represents an image search condition setting dialog. The dialog includes setting areas represented by Reference numerals 1402 to 1418.

Reference numeral 1402 represents the area for setting a paper type. Different paper types are displayed on a popup menu, and the user selects an intended paper type from the types displayed on the menu. Detailed information on a shape of paper and that on a shape (inside diameter, outside diameter, etc.) of a printable disk (optical disk of which a label surface can be printed thereon with an image) are set via advanced settings 1403.

Reference numeral 1404 represents the area for setting a specified main subject. In this example, as the main subject, a person is preliminarily set. If "Search person" is turned ON in "1404", the following areas 1405 to 1410 can be set.

Reference numeral 1405 represents the area for specifying a location within a printable area where the person is allocated. In this example, "Entire area" is selected. If "Entire area" is selected, the person may be allocated in any location within the printable area. Besides, the allocation in any of four regions into which the printable area is divided may be specified. Detailed information on the allocation is set via "1406".

Reference numeral 1407 represents the area for setting a size of the person to be allocated in the printable area. In this example, "Equal to or more than one quarter of area" is selected. Also, numeral information on the size of the person may be set via advanced settings represented by Reference numeral 1408.

Reference numeral 1409 represents the area for setting a direction the person faces in. In this example, "Frontward" is selected. In this case, an image displaying the person facing frontward is searched. As the direction the person faces in, "Rightward", or "Leftward" may be specified in addition to "Frontward". In addition, if directions in which a plurality of persons' faces are specified, the directions can be specified via advanced settings represented by "1410".

Reference numeral 1411 represents the area for searching an image scene. In this example, "Landscape" is selected. In this case, a landscape image not including a person is searched.

Reference numeral 1412 represents the area for searching a second object. The second object refers to a subject other than a person. By turning "Second object" ON in "1412" and further via advanced settings 1413, color, shape, and the like of the second object are set.

Reference numeral 1414 represents the area for setting keyword search. This area is used when an image is searched with keywords. The keywords include shooting date and time, image analysis information, image tag information, and the like. In this example, the shooting date and time are specified as the search condition. Specific date and time can be specified via advanced settings 1415.

Reference numeral 1416 represents a search start button. By clicking this button after making the above various settings, the image search is started. Reference numeral 1417 represents a cancel button. By clicking this button, all of the above various settings are canceled. Reference numeral 1418 represents a help button.

By performing the above-described image searching procedure after setting the predetermined pieces of information in the image search condition setting dialog, an image adapted for a specially-shaped printable area can be easily searched. Also, the image search condition setting dialog has a screen configuration by which all of the search condition elements for an image can be viewed, so that the user can predict to some extent what kind of image is to be actually searched, resulting in improvement of searching efficiency.

The present invention can also be provided in such a way that a recording medium recorded thereon with a program code of software realizing functions of the above-described embodiments is loaded in a system or device, and a computer such as the system reads the program code from the recording medium to execute it. The recording medium is a computer-readable recording medium. In this case, the program code itself read from the recording medium realizes the functions of the above-described embodiments, and therefore the recording medium recorded thereon with the program code constitutes the present invention. Alternatively, it may be adapted such that an operating system (OS) or the like running on the computer performs part or all of actual processing under the instruction of the program code, and the processing realizes the functions of the above-described embodiments. Still alternatively, the above-described embodiments may be provided in such a way that the program code read out of the recording medium is recorded in an expansion card or expansion unit of the computer, and then the expansion card or the like performs part or all of the processing under the instruction of the program code.

If the present invention is applied to the above recording medium, the recording medium is stored thereon with program codes corresponding to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-123667, filed May 8, 2007, which is hereby incorporated by reference herein in its entirety.

What is claimed is:

1. An image searching device comprising:
a component for inputting shape information on a printable area;
a component for setting an image search condition; and
a component for searching a print target image from a plurality of images on the basis of the shape information on the printable area, and the image search condition,
wherein the component for searching a print target image is configured to
detect a main subject included in the image, and
output as the print target image an image that includes the main subject fitting into the printable area and covers all of the printable area.

2. The image searching device of claim 1, further comprising a component for preliminarily storing the shape information on the printable area.

3. The image searching device of claim 1, wherein the shape information consists of coordinate information on the printable area.

4. The image searching device of claim 1, wherein the printable area is a label surface of an optical disk.

5. The image searching device of claim 1, wherein the component for searching a print target image is configured to enlarge or reduce an image meeting the search condition.

6. The image searching device of claim 1, wherein the image search condition includes a condition for specifying the main subject.

7. The image searching device of claim 6, wherein the main subject is a face region of a person.

8. The image searching device of claim 6, wherein the main subject is a face region of a person facing in a specified direction.

9. The image searching device of claim 6, wherein the main subject is specified on the basis of a specified keyword.

10. The image searching device of claim 1, wherein the image is an image clipped out of a moving image at certain time intervals.

11. The image searching device of claim 1, wherein the image search condition includes a condition for specifying a size of the main subject occupying the printable area.

12. A non-transitory computer-readable recording medium having computer-executable instructions for performing a method, the method comprising:
inputting shape information on a printable area;
setting an image search condition; and
searching a print target image from a plurality of images on the basis of the shape information on the printable area, and the image search condition,
wherein the step of searching a print target image includes detecting a main subject included in the image, and
outputting as the print target image an image that includes the main subject fitting into the printable area and covers all of the printable area.

13. An image searching method, comprising the steps of:
inputting shape information on a printable area;
setting an image search condition; and
searching a print target image from a plurality of images on the basis of the shape information on the printable area, and the image search condition,
wherein the step of searching a print target image includes detecting a main subject included in the image, and
outputting as the print target image an image that includes the main subject fitting into the printable area and covers all of the printable area.

14. An image searching method, comprising the steps of:
inputting shape information on a printable area;
setting an image search condition; and
searching a print target image from a plurality of images on the basis of the shape information on the printable area, and the image search condition,
wherein the step of searching a print target image includes enlarging or reducing an image meeting the search condition, and
determining whether or not a main subject included in the enlarged or reduced image fits into the printable area.

15. An image searching method, comprising the steps of:
inputting shape information on a printable area;
setting an image search condition; and
searching a print target image from a plurality of images on the basis of the shape information on the printable area, and the image search condition,
wherein the step of searching a print target image includes
    enlarging or reducing an image meeting the search condition, and
    determining whether or not the enlarged or reduced image covers all of the printable area.

16. An image searching device, comprising:
a component for inputting shape information on a printable area;
a component for setting an image search condition; and
a component for searching a print target image from a plurality of images on the basis of the shape information on the printable area, and the image search condition,
wherein the component for searching a print target image is configured to
    enlarge or reduce an image meeting the search condition, and
    determine whether or not a main subject included in the enlarged or reduced image fits into the printable area.

17. An image searching device, comprising:
a component for inputting shape information on a printable area;
a component for setting an image search condition; and
a component for searching a print target image from a plurality of images on the basis of the shape information on the printable area, and the image search condition,
wherein the component for searching a print target image is configured to
    enlarge or reduce an image meeting the search condition, and
    determine whether or not the enlarged or reduced image covers all of the printable area.

* * * * *